(12) United States Patent
Salvadé et al.

(10) Patent No.: US 9,310,178 B2
(45) Date of Patent: Apr. 12, 2016

(54) INTERFEROMETRIC DETERMINATION OF DISTANCE CHANGE WITH LASER DIODE, HIGH BANDWIDTH DETECTION AND FAST SIGNAL PROCESSING

(71) Applicant: HEXAGON TECHNOLOGY CENTER GMBH, Heerbrugg (CH)

(72) Inventors: Yves Salvadé, St-Imier (CH); Frank Przygodda, Friedrichshafen (DE); Marcel Rohner, Heiden (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 54 days.

(21) Appl. No.: 14/307,246

(22) Filed: Jun. 17, 2014

(65) Prior Publication Data

US 2014/0368832 A1 Dec. 18, 2014

(30) Foreign Application Priority Data

Jun. 18, 2013 (EP) .................................... 13172527

(51) Int. Cl.
| | |
|---|---|
| *G01B 11/02* | (2006.01) |
| *G01B 5/008* | (2006.01) |
| *G01B 9/02* | (2006.01) |
| *G01S 17/32* | (2006.01) |

(Continued)

(52) U.S. Cl.
CPC ............ *G01B 5/008* (2013.01); *G01B 9/02002* (2013.01); *G01B 9/0207* (2013.01); *G01B 9/02048* (2013.01); *G01B 9/02081* (2013.01); *G01B 9/02083* (2013.01); *G01B 11/026* (2013.01); *G01S 7/4812* (2013.01); *G01S 7/4915* (2013.01); *G01S 17/32* (2013.01); *G01S 17/50* (2013.01)

(58) Field of Classification Search
CPC .............................. G01B 11/005; G01B 11/14
USPC .................................. 356/482, 486, 493, 498
See application file for complete search history.

(56) References Cited

U.S. PATENT DOCUMENTS 8,368,900 B2 * 2/2013 Kawasaki .......... G01B 9/02008
356/498

FOREIGN PATENT DOCUMENTS

| EP | 1 696 201 A1 | 8/2006 |
|---|---|---|
| EP | 2589982 A1 | 5/2013 |
| WO | 98/38475 A1 | 9/1998 |

OTHER PUBLICATIONS

European Search Report dated Sep. 26, 2013 as received in Application No. 13 17 2527.

(Continued)

*Primary Examiner* — Jonathan Hansen
(74) *Attorney, Agent, or Firm* — Maschoff Brennan

(57) ABSTRACT

Method and systems for determining a change of distance to an object by interferometry with emitting measurement laser light from a laser diode are disclosed. The method may include receiving at least a part of the measurement laser light, superimposing the reflected measurement laser light with a reference laser light and thereby providing at an interferometric phase and determining the change of distance to the object depending on the superimposition. In some embodiments, the measurement laser light may be emitted with low coherence and broad spectral bandwidth. An emitting wavelength of the measurement laser light may be fluctuating hop-freely within the spectral bandwidth causing interferometric phase fluctuations.

20 Claims, 7 Drawing Sheets

(51) Int. Cl.
*G01S 17/50* (2006.01)
*G01S 7/481* (2006.01)
*G01S 7/491* (2006.01)

(56) References Cited

OTHER PUBLICATIONS

Abou-Zeid, A., "Diode lasers for interferornetric length measurements", Proceedings of SPIE, vol. 8759, Jan. 31, 2013, p. 87593X.

Ho, H.P., "Quantitative Phase Demodulation from Free-Running Michelson Interferometer by using a Novel Quadrature Moiré Grating with Misalignment Error Compensation", Optical Engineering, vol. 45, No. 7, Jul. 1, 2006, pp. 075601-075607.

Xie, F. et al., "Vibration-displacement measurements based on the phase tracking of an optical fiber Michel son interferometer", Optical Engineering, vol. 48, No. 4, Apr. 1, 2009, pp. 043608.

* cited by examiner

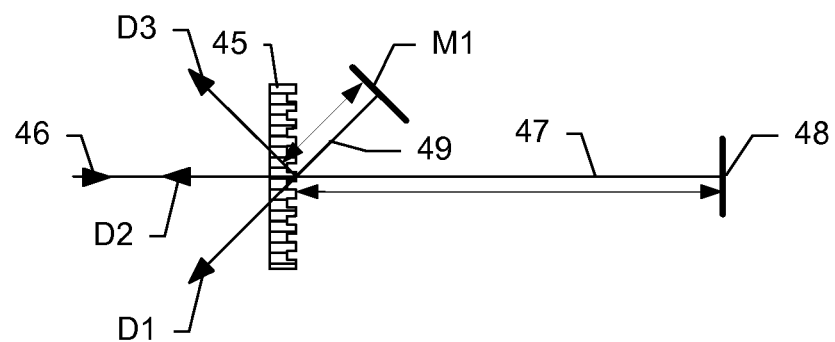
Fig. 9
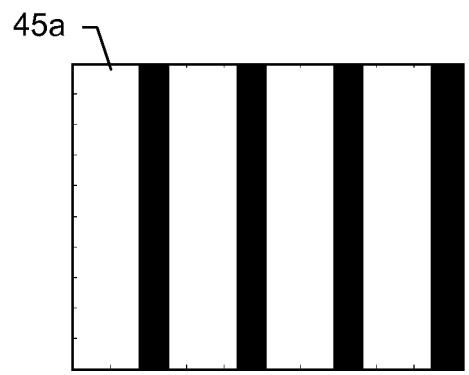 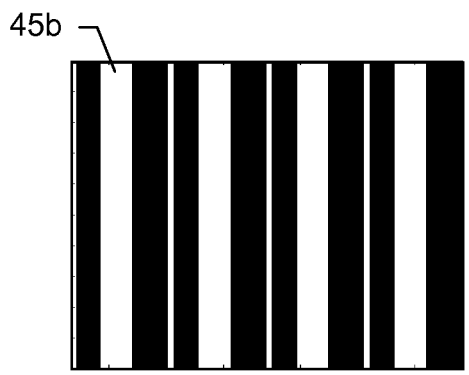
Fig. 10A          Fig. 10B

INTERFEROMETRIC DETERMINATION OF DISTANCE CHANGE WITH LASER DIODE, HIGH BANDWIDTH DETECTION AND FAST SIGNAL PROCESSING

FIELD OF THE INVENTION

The present invention generally pertains to a method for determining a change of distance to an object and to an interferometer for determination of that change.

BACKGROUND

Laser diode interferometry is well known and well documented in the literature, using either classical interferometry or self-mixing (or optical feedback) interferometry. Although self-mixing interferometry is an attractive technique (the interference phenomena occurs inside the laser diode cavity), it is difficult to be combined with frequency stabilization for deriving a precise wavelength, since the emitting wavelength is affected by the optical feedback.

Nowadays, laser diodes are built as coherent sources which are integrated in several consumer products (e.g. CD and DVD players, optical mice, laser pointers). However, in order to achieve high-accuracy displacement measurements (with ppm or even sub-ppm accuracies) and long range measurement an absolute frequency stabilisation of the laser diode is mandatory. Furthermore the coherence length of the laser source has to be comparable to the measuring range.

Research and development on stabilised laser diode interferometers has been the subject of several research projects. In 1995, a consortium composed of the «Observatoire Cantonal de Neuchâtel», the Institute of Microtechnology of Neuchâtel (IMT), and the company TESA could achieve absolute frequency stabilisation of laser diodes with respect to rubidium absorption lines for a high precision industrial interferometer in the framework of a CERS. Nevertheless, standard Fabry-Perot laser diodes (which were the most common laser diodes in those days) are affected by frequency mode hops (i.e. the frequency «jumps» by several tenths of nanometer and becomes out of the locking range of the stabilisation loop). This problem prevented the industrialisation of interferometer with such diodes.

The problem of mode hopping may be solved by using Distributed Bragg Reflector (DBR) or Distributed Feedback (DFB) laser diodes. The Bragg grating which is used in these technologies acts as frequency-selective mirror and allows to increase drastically the mode-hop free tuning range. DFB laser diodes emitting around 1.5 μm became the standard lasers used for telecommunication applications and are thus cost effective. However, the cost of so-called DBR and DFB (edge-emitting) lasers around 780 nm or 850 nm (corresponding to rubidium and caesium absorption wavelengths, respectively) is still high. Thanks to recent research projects in the field of miniature atomic clock, new technologies (such as Discrete Mode Diode lasers) and new suppliers are now emerging, thus indicating that more improvements can be expected in terms of performance.

Since 2004, Vertical Cavity Surface Emitting Laser Diodes (VCSELSs) are now manufactured in mass quantity (mainly for computer mice). They are composed of at least one Bragg grating and the length of the laser cavity is so small that any mode-hop is impossible unless the light is accidentally retro-reflected in the laser cavity. For instance, VCSELs used in laser computer mice are single-mode, emit around 850 nm (corresponding to Cs absorption wavelength), and require a very low threshold current. The drawbacks are however their coherence length which ranges from 1 m to only 3 m, the wavelength tolerance (+/−10 nm) and their frequency noise spectrum, which has a quite strong impact on interferometric phase fluctuations.

The generally limited coherence length of laser sources restricts the distance range of common interferometers. If the optical path length between reference arm and measuring arm is larger than the coherence length, the interference signal becomes very weak. Measurements far beyond the coherence length limit are not possible with standard detectors.

Furthermore, common interferometers may be sensitive to optical feedback from the reference and measurement arm. As a result, erratic mode-hops or even chaotic behavior of the laser radiation may result. Optical isolators are often used in order to mitigate this effect.

Moreover, the laser wavelength exhibits low-frequency variations. These often show up as 1/f-noise in the frequency spectrum. A relative change of the wavelength results in a corresponding change of the relative distance measured. The wavelength variations can be reduced by tuning the emitted laser wavelength to some frequency standard using temperature or current control of the laser. Depending on the control-loop bandwidth, a considerable portion of the 1/f-noise contributions can thereby be eliminated.

Moreover, the laser exhibits rapid fluctuations of the wavelength. These high-frequency fluctuations can be well described by (white) frequency noise that extends the acquisition bandwidth achievable with standard electronic components. On one hand, these frequency fluctuations cause phase-fluctuations which result in corresponding distance fluctuations. These effects can often be mitigated by proper filtering of the resulting distances. If such phase fluctuations are larger than $2\pi$ within the detection time, the determination of the average phase and therefore of the average distance fails. In this case, the acquisition electronics is not able to follow the signal, such that the phase can not be determined unambiguously and phase-unwrapping fails.

Above mentioned disadvantages of laser diodes, in particular VCSELs, in combination with interferometers for long range measurement of distances or changes of distance to a target may be avoided by using laser diodes with great coherence lengths or by using other kind of beam sources like gas lasers, e.g. HeNe-Lasers. Such a device (laser tracker) with a laser diode with great coherence length is described e.g. in European patent application No. 11187614.0. Additionally, state of the art total stations are typically equipped with gas lasers for interferometry. However, the arrangement of a gas laser for use of distance measurement requires quite some space and the costs of a specified laser diode with great coherence length or the costs for a gas laser source are comparably high. In particular, considering miniaturisation efforts, the space requirement are one main disadvantage for such devices.

Some embodiments of the present invention may provide for an improved interferometric measuring device with beam source comprising compact design and providing precise distance change measurements at long range distances, e.g. up to 100 m.

Some embodiments of the present invention may provide for an improved interferometric measuring device with a laser diode, the diode comprising relatively moderate coherence but the device anyway providing precise long range distance change measurement.

Some embodiments of the present invention may provide for an improved interferometer with a low cost and a comparable low performance laser diode and with compensation capability enabling long range distance change measurement.

Some embodiments of the invention relates to a method for determining a change of distance to an object by interferometry with emitting measurement laser light from a laser diode, receiving at least a part of the measurement laser light reflected from the object, superimposing the reflected measurement laser light with a reference laser light and thereby providing at least an interferometric phase and determining the change of distance to the object depending on the superimposition.

According to some embodiments of the invention, the measurement laser light is emitted with low coherence and broad spectral bandwidth, wherein an emitting wavelength of the measurement laser light is fluctuating hop-freely within the spectral bandwidth causing interferometric phase fluctuations, in particular wherein the measurement laser light is emitted with a coherence length between one and three meters. The interferometric phase is continuously detected with a first detection rate, the first detection rate and a rate for processing of the detected interferometric phase being that high that the interferometric phase fluctuations are continuously incrementally tracked so that successive interferometric phase states provided by successive detections of the interferometric phase differ by a phase shift of less than $\pi$, in particular by a fraction of $\pi$. Moreover, detected phase fluctuations are averaged for a defined averaging time period and an averaged phase is derived. The change of distance to the object is derived with a second detection rate in dependency on the averaged phase, wherein the second detection rate is correlated with the averaging time period.

According to some embodiments of the invention, an effect of the present detection and determination of distance changes is that distance changes are measurable over a measuring range, which is significantly greater than the coherence length of the measuring light used for the detection.

In particular, the distance to the object is assumed as changing maximal with a predefined velocity of the object, in particular 10 m/s, while detecting the successive interferometric phase states. The maximum object-velocity is chosen so that the phase fluctuations and a phase shift caused by the movement of the object together are less than $\pi$.

SUMMARY

The invention generally relates to interferometry with use of a laser diode emitting laser light which is fluctuating within a spectral bandwidth. In order to provide long range distance change measurement with an interferometric device with such laser diode the emerging phase fluctuations are monitored with a detecting device providing a detection and signal and/or data processing speed that is such high that fluctuations of the interferometric phase (generated by superimposing the fluctuating measurement laser light with reference laser light) are traceable, in particular a progression of an averaged interferometric phases can be derived, e.g. with lower speed. That means the fast detection and processing rate is chosen such high that the difference between two successively detected interferometric phase states is less than $\pi$. Distance change determination is provided by averaging the detected interferometric phase for a defined time period and thereof deriving an averaged phase. Distance change is then derived by considering a series of averaged phase values with a second detection rate (lower speed).

In context with a specific embodiment of the invention, a first, second or more interferometric signals are provided by continuously detecting the superimposition of the measurement laser light with the reference laser light, in particular wherein the detection is performed with the first detection rate.

By such a superimposition e.g. quadrature detection of the phase fluctuations and of the averaged phase values is enabled and, furthermore, a direction of the change of distance to the object is determinable, i.e. quadrature detection enables differentiating unambiguously between increasing and decreasing distance change.

According to the invention, particularly, the interferometric phase and the interferometric phase fluctuations may be derived from at least the first and the second interferometric signals. Furthermore, the change of distance to the object may be determined on basis of at least the first and the second interferometric signals, wherein a direction of the change of distance is derived depending on a change of at least the first and the second interferometric signal.

The determination of the interferometric phase from the first and second interferometric signals can be done e.g. by using the ATAN2 function (arctangent function with two arguments) in combination with a phase unwrapping algorithm.

Furthermore, according to a particular embodiment of the invention, the first and/or second or more interferometric signals are modulated in a defined manner and the modulated first and/or second or more interferometric signals are detected in order to calculate an offset and/or a normalisation for monitoring of the interferometric signals, in particular to calculate an offset and/or a normalisation from at least the first and the second interferometric signals generated while modulating. The phase may be modulated with frequencies between 10 kHz to 30 kHz.

In context with a further embodiment of the invention, a modulation of the first, second or more interferometric signals is realised by periodically alternately varying the emitting wavelength of the measurement laser light, in particular by varying the current and/or the temperature of the laser diode and/or by varying the cavity length of the laser diode, and/or by periodically alternately varying an optical path length for the measurement laser light or for the reference laser light.

Generally relating to the present invention, for determining (and for monitoring) the interferometric phase generally many methods are known. Some common techniques are:

Heterodyning: Frequency-shifting either of the reference or measurement arm, e.g. employing an acousto-optic modulator.

Quadrature detection: superposing reference and measuring beam with adequate phase shifts allow for a determination of the interferometric phase. Superposition and phase-shift can be obtained e.g. with a Michelson interferometric setup using beam splitter cubes.

3x3 Fibre-coupler: quadrature detector realized with fibre optical elements instead of beam splitters.

Path length modulation of the reference arm: e.g. with opto-mechanical (e.g. piezo driven mirror) or opto-electronical elements which provide changing an optical path length.

These mentioned techniques are relatively complex and require precise setup. With view to the present invention more suitable solutions may be provided by:

Use of a diffractive optical element (DOE), for example a binary DOE, as a free-space 3x3-coupler. The interferometric signals on two output ports have a phase-offset that is function of a grating period and a grating depth of the DOE. Ideally, the DOE may be designed to yield a phase-offset of $\pi/2$ between two interferometric signal channels. However, the interferometric phase can be extracted for other phase-offsets as well.

Modulation of the laser wavelength for generating a corresponding modulation of the interferometric signals. The resulting information can be used to determine unambiguously the interferometric phase.

Referring to the aspect of wavelength stabilisation, according to a specific embodiment of the invention an actual absorbing level of the measurement laser light is measured in dependency on the emitting wavelength and the emitting wavelength of the measurement laser light is adjusted in dependency on the actual absorbing level in an automated and continuous manner, in particular wherein the emitting wavelength is adjusted by variation of current and/or temperature of the laser diode and/or by variation of the cavity length (e.g. with a tunable VCSEL—Vertical Cavity Surface Emitting Laser Diode).

In order to provide known laser wavelength—according to the invention—so called slow frequency fluctuations mainly caused by the 1/f noise part of the frequency noise power spectral density of the laser diode may be actively controlled by an active frequency stabilization loop, in particular by use of an absorption cell. The wavelength of the laser diode may be adjusted by temperature and current settings at the diode.

In particular, according to a further embodiment of the invention, an error value may be calculated depending on an absorbing level measured while modulating the first and/or second or more interferometric signals in the defined manner, wherein the adjusting of the emitting wavelength is performed in dependency on the calculated error value, in particular wherein the error value is derived by digital processing.

According to a more specific embodiment of the invention, the error value is used for fine adjusting a conversion factor in order to increase accuracy for the determined change of distance, the conversion factor defining a conversion from continuously determined phase values to distance change values.

In context with the method for determining a change of distance according to the invention, in particular, the measurement laser light is emitted by a laser diode. This diode—according to a specific embodiment—is built as a Vertical Cavity Surface Emitting Laser Diode (VCSEL) comprising a Bragg grating, wherein the laser diode is designed such that the emitting wavelength of the measurement laser light is adjustable within a wavelength region, in particular wherein the wavelength is adjustable by variation of temperature and/or current of the laser diode and/or variation of the cavity length (tunable VCSEL).

As an occurring phase change (caused by modulation of wavelength) is proportional to a distance to the object, for determining or at least for estimating an absolute distance to the object, this phase change may be measured and the distance may be derived. The other way round, the modulation is controlled so that phase change stays constant and the distance may be derived from the controlling of the modulation.

With other words, according to a specific embodiment of the invention, the first and/or second or more interferometric signals are modulated in a defined manner and an absolute distance to the object is derived on basis of the modulated first and/or second or more interferometric signals.

The invention also relates to an interferometer for determining a change of distance to an object, the interferometer comprising a laser diode for emission of measurement laser light, a reference arm defining a reference optical path length for a reference laser light, wherein the reference laser light is derived from the measurement laser light by use of a beam splitter, and a measurement arm defining a measurement optical path length for the measurement laser light. Furthermore, receiving means for receiving at least a part of the measurement laser light reflected from the object (e.g. retro reflector), superimposition means for superimposing of the measurement laser light with the reference laser light and thereby providing an interferometric phase, a detection unit for continuously detecting the superimposition of the measurement laser light with the reference laser light and for providing the interferometric phase and a controlling and processing unit at least for determining the change of distance to the object depending on the superimposition are provided with the interferometer.

According to the invention, the laser diode is designed so that the measurement laser light is emitted with low coherence and broad spectral bandwidth, wherein an emitting wavelength of the measurement laser light is fluctuating hop-freely within the spectral bandwidth causing interferometric phase fluctuations, in particular wherein the measurement laser light is emitted with a coherence length between one and three meters. Additionally, the controlling and processing unit is adapted for execution of a distance measurement functionality on execution of which the determination of the change of distance to the object is performed by continuously detecting the interferometric phase with the detection unit with a first detection rate, the detection rate and a rate for processing of the detected interferometric phase being that high that the interferometric phase fluctuations are continuously incrementally tracked so that successive interferometric phase states provided by successive detections of the interferometric phase differ by a phase shift of under $\pi$, in particular by a fraction of $\pi$. The detected phase fluctuations are averaged for a defined averaging time period and an averaged phase is derived. In addition, the change of distance to the object is determined with a second detection rate in dependency on the averaged phase, the second detection rate being correlated with the averaging time period.

Particularly, such interferometer is used with a CMM (co-ordinate measuring machine) for measuring a position or a positional change of a measuring point or for calibration of such machine.

For providing an unambiguous detection of the progression a second or more interferometric signal may be generated. According to the invention, the superimposition means may be build so that the measurement laser light is superimposed with the reference laser light so that a first, a second or more superimposed light signals are provided, in particular wherein the superimposition means comprise a diffractive optical element, in particular a binary phase grating.

Particularly, the detection unit—according to the invention—comprises a first, a second or more detection components, wherein each of the detection components is arranged for detection of one of the first, second or more superimposed light signals and a first, second or more interferometric signals are providable by the detection components. In that context, the detection unit may comprise—according to a specific embodiment—an analog-digital converter and a programmable logistic device or limiting amplifiers and zero-crossing quadrature detection for processing the interferometric signals.

According to further specific embodiments of the invention, after a detection of the phase-shifted interferometric signals, analog conditioning electronics are used to detect their offset and amplitude and to correct the offset and normalize the amplitudes. The quadrature detection electronic circuit can be implemented in two different ways or in a combination thereof. The first implementation of the circuit comprises A/D converters and programmable logic devices, wherein each of the interferometric signals (generated by superimposition of the measurement light with the reference light in different ways and/or at different locations) is detected and processed by a combination of an A/D converter and a programmable logic device. In context with this first implementation, the A/D converters may be built e.g. as units with up to 800 MS/s with 6-bit resolution (6 bits, 500 MS/s). The programmable logic device may be provided by a FPGA or by complex programmable logic devices (CPLD) with a clock speed of >500 MHz.

According to a variation of above embodiment, the offset and amplitudes of the interferometric signals are determined after digitisation and signal-adaptation (correction) to derive offset free and normalized signals (by digital processing). Furthermore such a combination is possible that the offset and amplitudes of the interferometric signals are determined after digitization and error signals are generated. The error signals are digital-to-analog converted in order to be used in the analog electronics to correct offset and normalize the amplitudes.

The second implementation according to the invention comprises limiting amplifiers (comparators) and zero-crossing quadrature detection. Thus, A/D converters are avoided. Sine and cosine signals generated by detecting the interferometric phases are converted in binary signals using the limiting amplifiers. A quadrature zero-crossing counter is then used to count the number of $2\pi$ cycles (in a bidirectional manner). The resolution of such electronic counter is however limited to ¼ of an interferometric period (such periods are counted to derive a change in distance and emerge by superimposing the measurement light with the reference light), i.e. $\pi/2$. Although, quadrature counters are commercially available (for example for optical encoder products), the maximal frequency typically is not sufficient. Thus, the quadrature counters are implemented in a CPLD or FPGA working at suitable high frequencies. Since the initial measurement rate must be much higher than the required measurement rate, an average over e.g. 10'000-100'000 consecutive samples can be implemented to further reduce errors caused by random fluctuations and decrease the data rate to 100 kHz (or even less).

According to a particular embodiment of the invention, a specified signal processing concept is used. In this context, using limiting amplifiers for quadrature detection is assumed. The binary quadrature interferometric signals "Q" and "I" coming from the limiting amplifiers (or comparator respectively) are transferred to the CPLD or FPGA device for signal processing. In a first step the high frequency input signals are serialised in so-called SERDES units (SErializer-DESerializer). This reduces the data rate (e.g. here by a factor of two). The parallel signal streams are then transferred to further processing sub-units including look-up-tables (LUT). The LUT assign counting signals to the "Q" and "I" signals of the present and/or the last sample. If "Q" and "I" for example represent phase quadrant A by the last and phase quadrant B by the actual sample, a counting signal triggers the quadrant counter to add +1. In the case if no change between last and actual sample is given, the quadrant counter does not increment. If the difference between a last and an actual sample of two quadrants exceeds a predetermined value, an error signal can be generated to indicate ambiguous phase increments. The outputs of the parallel counters are combinable in order to achieve a total number of quadrant counts. Since the phase noise is a statistical value the average of the total number stays at zeros as long as the distance to an object (e.g. retro reflector) does not change. If the object is moving, the average of the total quadrant counts changes proportional to the distance. The averaging can be performed within a measuring cycle period of e.g. 10 kHz.

According to a further particular embodiment of the invention with quadrature detection, the interferometer comprises a modulation unit for modulation of the first and/or the second or more interferometric signals in a defined manner and detecting the modulated first and/or second or more interferometric signals for continuously incrementally tracking the phase fluctuations. For that purpose, the modulation unit may comprise an acousto-optical modulator and/or an opto-mechnical or opto-electronical device, in particular a piezo element moving a reference mirror, for providing the modulation of the first and/or the second or more interferometric signals by periodically alternately varying the emitting wavelength of the measurement laser light and/or periodically alternately varying the optical path length of the measurement arm or of the reference arm.

Regarding the structural design of the laser diode, according to the invention, the laser diode may be built as a Vertical Cavity Surface Emitting Laser Diode (VCSEL) comprising a Bragg grating, wherein the laser diode may be designed such that the emitting wavelength of the measurement laser light is adjustable within a wavelength region, in particular wherein the wavelength is adjustable by variation of temperature and/or current of the laser diode and/or variation of the cavity length (tunable VCSEL).

The optical frequency of Vertical Cavity Surface Emitting Laser Diodes depends on the injection current and on the temperature of the diode. The current coefficient is almost 100 times higher (about 300 GHz/mA) compared to a Fabry-Perot laser diode. As a result, in order to keep the (white) noise part of the frequency noise spectrum to a few $10^6$ $Hz^2$/Hz, the current source of VCSELs may be designed so that extremely low-noise is realised. E.g. the noise is lower than 0.02 $nA/Hz^{0.5}$ over the detection bandwidth. If the bandwidth of the source may be limited by low-pass filtering (according to an embodiment of the invention) this requirement can be relaxed drastically.

Furthermore, the operating temperature of the VCSEL—and with it the wavelength of the emitted light—may be controlled by means of a standard thermo-electric temperature controller. The classic controller e.g. may be composed of a NTC resistor as temperature sensor, a proportional-integrator regulator, and a Peltier cooler (or heater) to change the temperature of the VCSEL.

For stabilising purposes in context with the invention, the interferometer particularly may comprises an absorbing medium defining absorbing levels within the wavelength region and an absorption detector for measuring an actual absorbing level of the measurement laser light in dependency on the emitting wavelength, wherein the absorbing medium is provided by an atomic or molecular absorption cell, in particular wherein the absorption cell comprises rubidium vapor or caesium vapor. Suitable absorption lines provided by rubidium vapor correspond to wavelengths of 780 nm and 795 nm for caesium vapor to 852 nm and 894 nm.

Moreover, the controlling and processing unit of the interferometer—according to the invention—may be configured so that a method for determining a change of distance to an object according to the invention is executable, in particular wherein the interferometer comprises an adjusting unit being built for controlling temperature and/or current for the laser diode, in particular wherein the adjusting unit comprises a temperature sensor, a proportional-integrator regulator and a Peltier element for adjusting the temperature.

A further aspect of the invention relates to a measurement device, in particular a total station or a laser tracker, for determination of a position of an object comprising an interferometer described above according to the invention. The geodetic measurement device further comprises a base defining a vertical axis, a support member rotatable around the vertical axis relative to the base and defining a horizontal axis, an aiming unit rotatable around the vertical and the horizontal axis relative to the base for directing the measurement laser light towards the object and angle measurement means for determination of an orientation of the aiming unit relative to the base and the support member.

Such measurement device may be used for determining a position of one or more components of a coordinate measuring machine (CMM) or for calibration of a CMM.

Alternatively, such measurement device is built as coordinate measuring machine (CMM), comprising a base, a drive mechanism, adapted to drive a probe head in a manner such that the probe head is capable to move relative to the base for approaching a measurement point and a frame structure, to which the probe head is attached, the frame structure being movable in a horizontal (x, y) and a vertical (z) direction.

Furthermore, the invention relates to a computer program product with program code being stored on a machine readable medium, the program code being configured to automatically execute and operate the method for determining a change of distance to an object according to the invention, particularly if the program is carried out on a controlling and processing unit of an interferometer according to the invention.

BRIEF DESCRIPTION OF THE DRAWINGS

The invention in the following will be described in detail by referring to exemplary embodiments that are accompanied by figures, in which:

FIG. 9 shows a first embodiment according to the invention for quadrature detection.

FIG. 10A and FIG. 10B show two embodiments of binary phase gratings for realising quadrature detection according to the invention.

DETAILED DESCRIPTION

Figure 1:
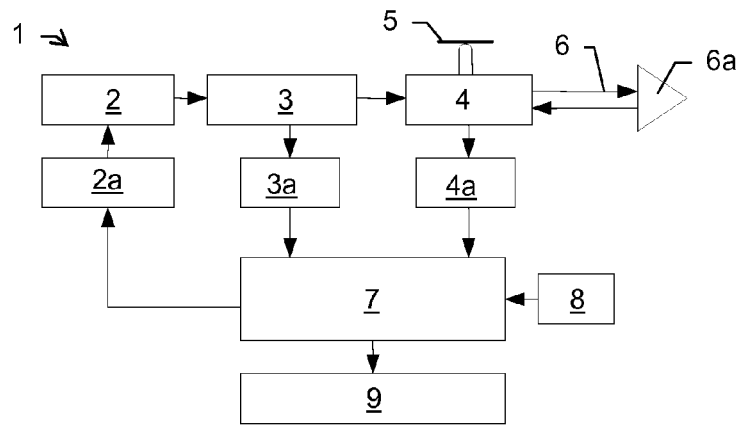
FIG. 1 shows a known setup for an interferometer comprising a stabilised laser source.

FIG. 1 shows a known setup for an interferometer 1 comprising a laser source 2 that generates optical radiation at some optical wavelength. In order to stabilise the wavelength to some measurement standard, at least some of the optical radiation, is directed to a wavelength measurement device 3. The laser wavelength is controlled—typically by controlling 2a the laser temperature and/or laser current—based on a measurement 3a by the measurement device 3, wherein measurement information is acquired by electronics 7 in order to control the laser wavelength. An optical setup 4 directs the light to both a reference 5 and a measurement 6 arm, wherein the measurement laser light is reflected at a reflector 6a. The reflections of both arms 5,6 are directed to a photodetector unit 4a, where the two signals interfere such that interferograms develop. The interferometric signals are acquired by the electronics 7 and processed in order to extract distance information. In an incremental interferometer, the phase of the interferogram is measured to within a $2\pi$-ambiguity, and the phase change—corresponding to the distance change—is obtained using phase-unwrapping (processing continuous phase value). Moreover, climate information 8 is input into the electronics 7 and a communication interface 9 is provided for controlling the interferometer 1 and reading out determined distance information.

Figure 2A:
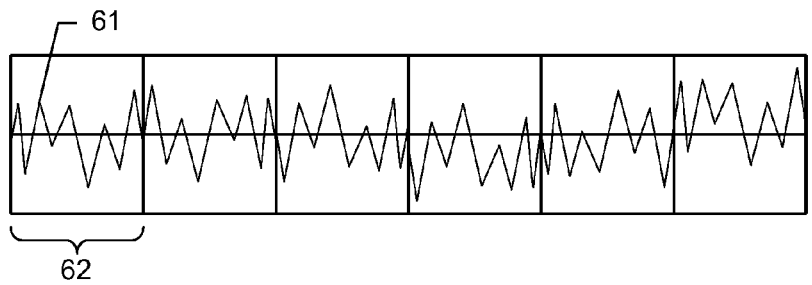
FIGS. 2A-C show a detection of the interferometric phase with a first detection rate, an averaging period for averaging detected phase fluctuations and the tracking of the phase according to the invention.
Figure 2B:
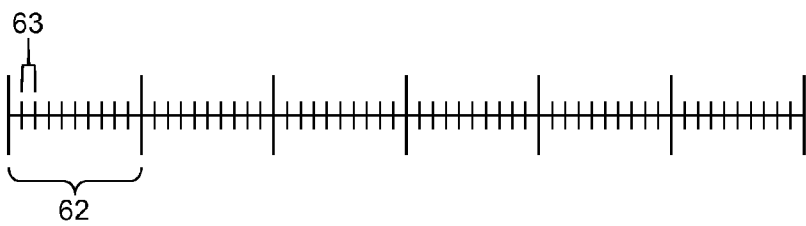
Figure 2C:
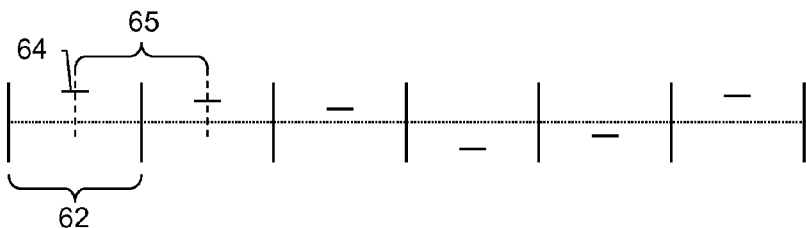

FIGS. 2A-C show a detection of the interferometric phase with a first detection and sampling rate 63, an averaging period 62 for averaging detected phase fluctuations 61 and the tracking of the averaged phase according to the invention.

FIG. 2A shows interferometric phase fluctuation 61 caused by the fluctuation of the wavelength of the laser diode with broad spectral bandwidth according to photon noise in a very schematic manner. The fluctuation may be detected and processed with A/D converters and programmable logic devices according to above mentioned signal processing design. The interferometric phase is determined by superimposing the measurement laser light reflected from an object with the reference laser light. Moreover, a period 62 is shown within which an averaged phase value is determined in order to derive an averaged phase. The monitoring of the averaged phases allows for the determination of the distance change.

FIG. 2B shows the averaging period 62 together with sub-sections 63 defining the first detection and sampling rate 63 according to the invention. The number of sub-sections 63 within the averaging period 62 as shown is just exemplarily but may be much greater for (realised) embodiments according to the invention, e.g. the detection and sampling is performed with 500-1000 MHz. For every single sub-section 63 a particular phase value is derived from the detected phase fluctuations 61, wherein the detection and sampling rate 63 is chosen so fast that emerging phase differences are determined so that the phase is fluctuating from phase value to phase value by differences of less than $\pi$, in particular less than a fraction of $\pi$. Particularly, the rate 63 is chosen in dependency on assumed occurring maximum frequency of phase fluctuations and/or depending on an absolute value for a maximum derivative of the fluctuation of the emitting wavelength. According to the shown example, ten phase values—corresponding to the number of sub-sections 63 within one period 62—are determined within one averaging time period 62, wherein much more phase values are determined within one averaging time period 62 according to typical other embodiments of the invention.

FIG. 2C shows the averaging time periods 62 and an averaged phase value 64 for any period 62, wherein the averaged phase value 64 is changing depending on the determined phase values within the respective period 62. A change of distance to the object can be derived on basis of these averaged phase values 64, wherein the progression of the phase value 64 represents the phase change to be considered for distance measurement. Averaged phase values 64 are derived with a second detection rate 65 (10-30 kHz) for determining a change of distance to the object, wherein this second detection rate 65 is set that fast that even for fast change of the averaged phase values 64 these changing values are tracked precisely, in particular by preventing a loss of a phase change (phase jump). Thus, the distance to the object may be actualised continuously with a time frequency 65.

The rate for detecting the phase fluctuations may be 10'000-100'000 times greater (faster) than the rate for averaging the detected phase states and the rate for determining distances thereof.

Moreover, according to a specific embodiment of the invention, with use of e.g. quadrature detection of the phase fluctuations 61 the fluctuations may be continuously incrementally tracked and a direction and amount of distance change can be derived in dependency on the simultaneously derived averaged phase values.

Figure 3A:
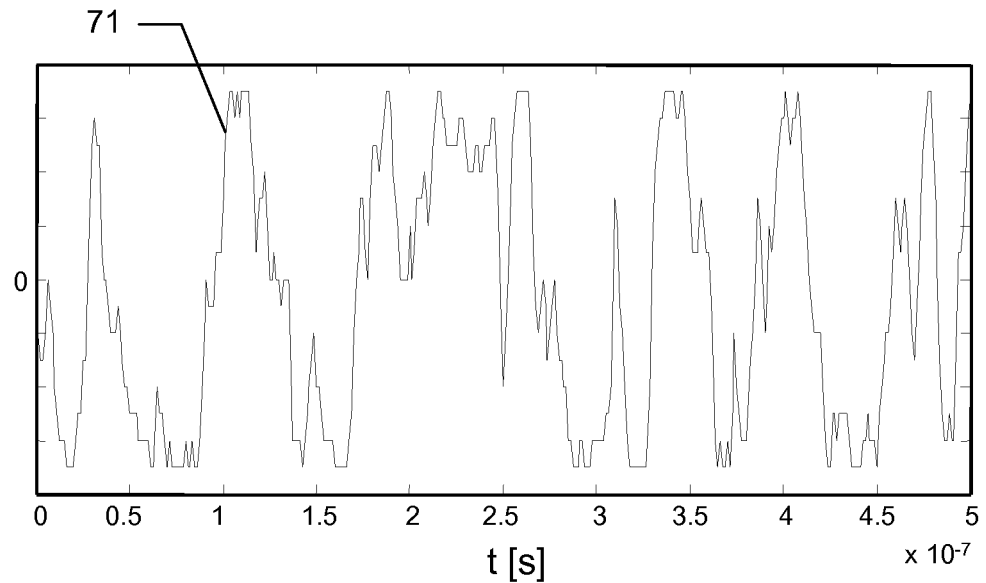
FIG. 3A and FIG. 3B each show a digitised signal 71,72 from two different decoders for quadrature detection with A/D-converters according to the invention.
Figure 3B:
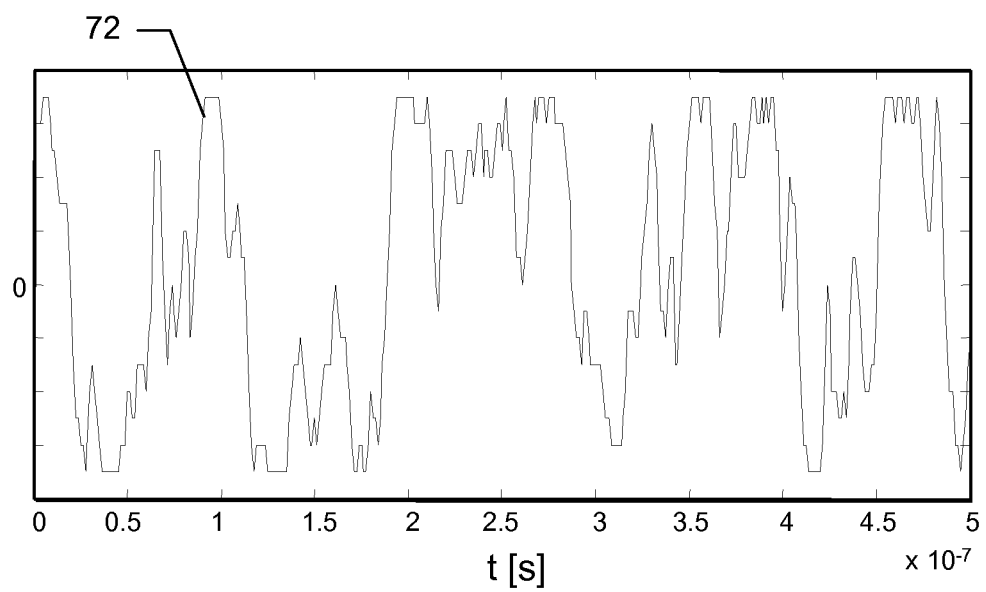

FIG. 3A and FIG. 3B each show—according to the invention—a digitised interferometric signal 71,72 from two different outputs of a quadrature detector. The signals 71,72 are 4-bit digitised and plotted over processing or digitising time, respectively. The signals 71,72 are compensated by a compensating current derived by averaging minima and maxima of the digitised signals 71,72 in order to determine an offset and an amplitude for correction. The two interferometric signals enabling the determination of the interferometric phase. A change of the phase by fluctuation and/or by change of distance to an object may be derived by consideration of both signals 71,72, which allows to unambiguously determine a direction of the change by considering the phase offset between the signals 71,72.

Figure 4A:
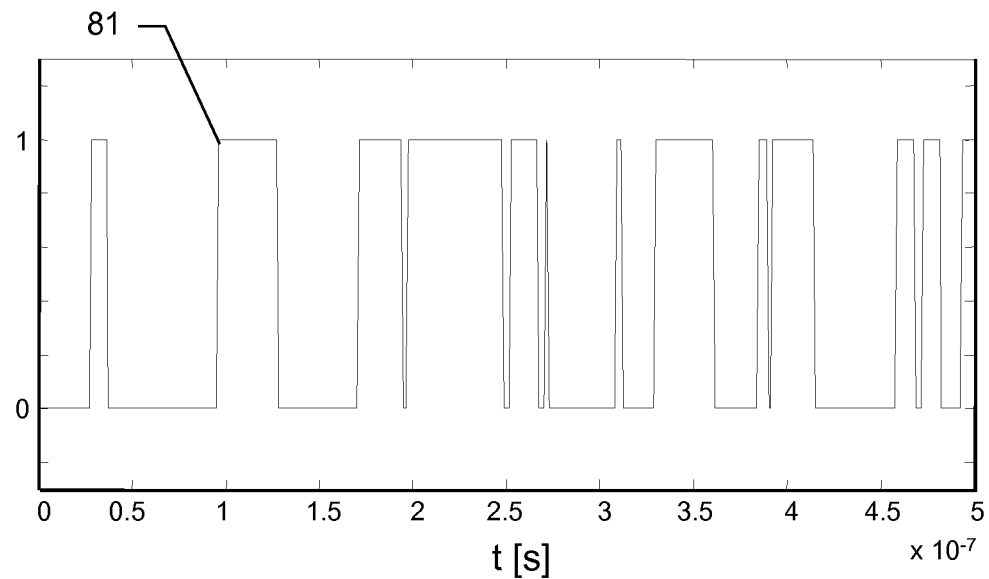
FIG. 4A and FIG. 4B each show a 1-bit digitised signal 81,82 from two different decoders for quadrature detection by use of limiting amplifiers (comparator) and zero-crossing quadrature detection according to the invention.
Figure 4B:
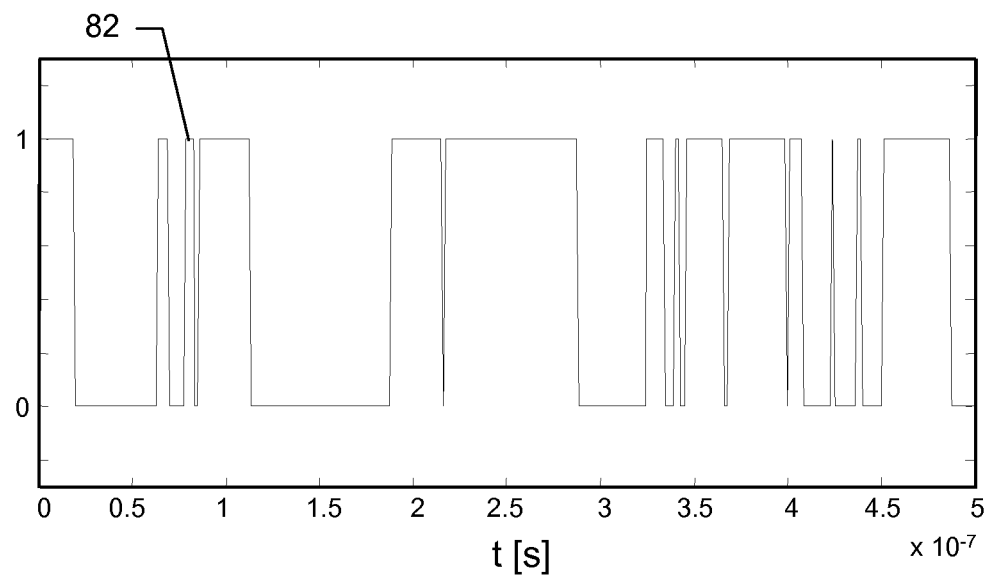

According to the invention, FIG. 4A and FIG. 4B each show a 1-bit digitised signal 81,82 from two different decoders for quadrature detection by use of limiting amplifiers (comparator) and zero-crossing quadrature detection as mentioned above. The number of samples "1" and the number of samples "0" within a defined time period are determined and a deviation is derived thereof. An additional controlling unit controls the working point of a comparator so that the deviation becomes 0. The signals 81,82 then are "symmetrically" regarding the amount of samples "1" and "0" and provide phase detection (e.g. by additional use of a look-up table).

Figure 5:
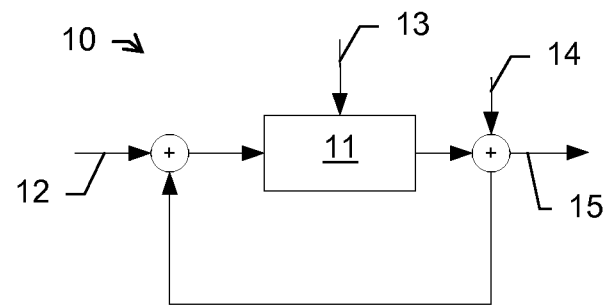
FIG. 5 illustrates a wavelength stabilisation loop with a laser diode, in particular a VCSEL, according to the invention.

FIG. 5 illustrates a wavelength stabilisation loop 10 with a laser diode 11, in particular a VCSEL, according to the invention. The basic idea of the present invention is the combination of a mode-hop free common laser diode 11 (e.g. VCSEL) with a high bandwidth detector and fast signal processing. Such combination enables to use diodes 11 for interferometric distance measurements beyond the conventional definition of coherence length limit of common interferometers. The main advantages of VCSELs compared to other semiconductor lasers, are the relatively low price, the almost-perfect circular Gaussian-like beam shape and the absence of mode-hops that usually affect classical laser diodes.

The mode-hop free laser diode 11 (VCSEL) for use with the present invention may be composed of at least one Bragg grating, wherein the length of the laser cavity is that small that any mode-hop is impossible unless the light is accidentally retro-reflected into the laser cavity. Therefore, referring to a specific embodiment of the invention, it is proposed to use a VCSEL for long-range distance measurements.

An important value for an interferometric distance determination is the laser wavelength 15. As the wavelength of laser diodes (in particular of a VCSEL) is stochastically varying due to low-frequency phase fluctuations, it has to be ensured, that the measuring wavelength 15 is known exactly and is stable while measuring. A typical required accuracy in this context is 0.01 to 0.5 ppm. This accuracy can be achieved with a stabilization of the diode 11 via its temperature and driving current. As wavelength standard an absorption line of rubidium or caesium can be used. The electronic control loop 10 sets the current in a way that the diode 11 (average) wavelength matches the wavelength of the absorption line.

The wavelength of the absorption line is inputted as a setpoint 12 into the control loop 10. A current wavelength of the diode 11 is compared 14 to the setpoint 12 and an adjusting parameter 13, in particular temperature and/or current of the diode 11, is set so that the current wavelength fits the setpoint wavelength 12 and, thus, the laser wavelength 15 is stabilized. Such controlling of the laser wavelength 15 is performed in a continuous manner, i.e. the wavelength 15 may be adjusted periodically e.g. at least once a second, at least once a millisecond or even faster.

Figure 6:
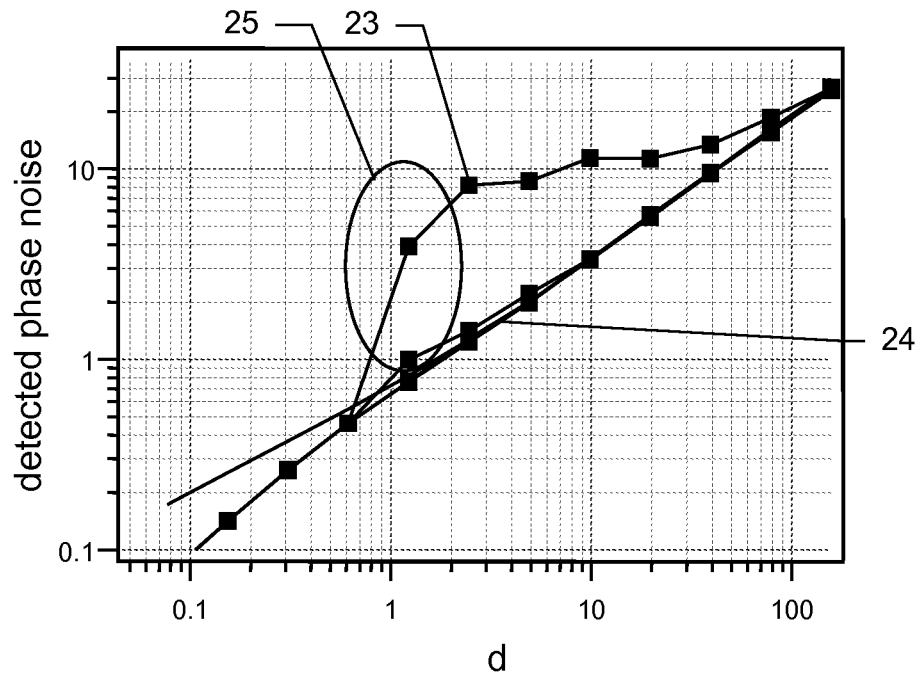
FIG. 6 shows random-walk like distance errors that accumulate with time by illustrating detected phase noise standard deviation over measured distance for different sampling times.

A specific issue limiting the use of low-coherence laser sources, like proposed mode-hop free laser diodes, is to guarantee the absence of phase-unwrapping errors within a measurement. These cause random-walk like distance errors 25 that accumulate with time. In general, this behaviour is shown in FIG. 6 by illustrating detected phase noise standard deviation over measured distance d, wherein a measurement 23 is sampled with a 10 ns interval (low sampling speed) and a measurement 24 is sampled with a 2 ns interval (high sampling speed). As can be seen, once the phase increment between two sampling points exceeds a specific value, in particular $\pi$, large measurement errors can result. Irrespective of the maximum measured distance d, the maximum phase increment between two samples reduces with smaller sampling intervals $\Delta$. Therefore, according to the invention signals generated with detection of the interferometric phase are sampled with high speed.

Figure 7:
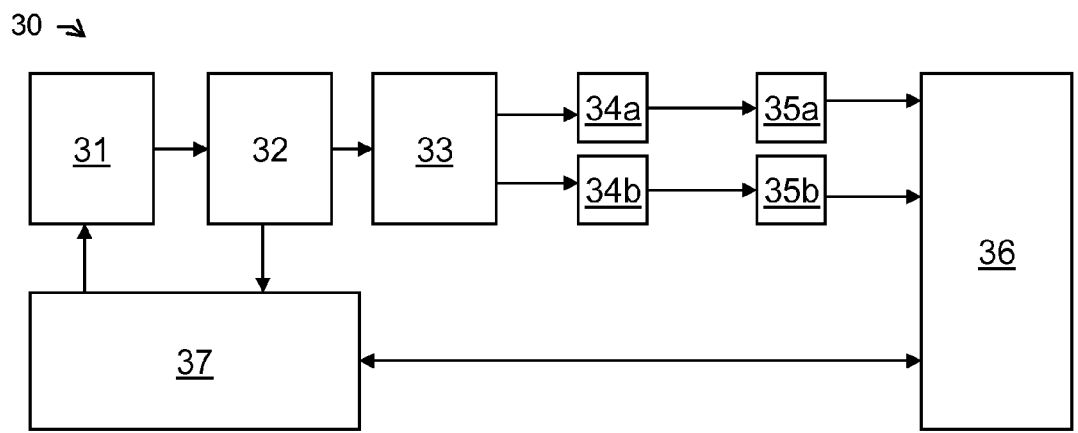
FIG. 7 shows a first embodiment of an interferometer according to the present invention.

FIG. 7 shows a first embodiment of an interferometer 30 according to the present invention. The interferometer 30 comprises a Vertical Cavity Surface Emitting Laser Diode 31 (VCSEL) and an absorption cell 32. The absorption cell 32 provides an absorbing medium, e.g. rubidium or caesium vapor, wherein an absorption level of measurement laser light emitted by the VCSEL 31 is measured, the measured level is acquired by a controlling and processing unit 37 and the average wavelength of the diode 31 is adjusted depending on the measured absorption level. Such adjustment may be performed by varying temperature and/or current of the diode 31 via the controlling and processing unit 37.

Furthermore, the interferometer 30 comprises a quadrature detecting unit 33 for optical phase detection in order to monitor high-frequency phase fluctuations described above.

For that purpose, according to the invention, e.g. the following solution may be realised: a binary diffractive optical element (DOE) is used as a free-space 3×3-coupler. The interferometric phases on at least two output ports have phase-offsets that are function of the grating period and grating depth of the DOE. In particular, the DOE is designed to yield a phase-offset of $\pi/2$. However, the interferometric phase can be extracted for other phase-offsets with increased complexity of processing, as well. A corresponding modulation of the interferometric phase is caused by modulation of the laser wavelength, wherein the resulting information can be used to determine unambiguously the interferometric phase.

The quadrature detector 33 provides (at least) two phase-shifted signals, of the form $$S_1(t)=A_1+B_1 \sin [\phi+\phi_\tau(t)] \text{ and } S_2(t)=A_2+B_2 \sin [\phi+\phi_\tau(t)+\phi_{det}],$$

wherein $\phi$ is the interferometric phase (given by $\phi=4\pi v d/c$, d=measurement distance, v=laser frequency) and $\phi_\tau(t)$ is the instantaneous phase noise at the interferometric delay $\tau$, and $\phi_{det}$ the phase offset of the interferometric signals from the quadrature detector (ideally $\pi/2$). The offsets $A_1$ and $A_2$ can be calibrated and subtracted and, in a similar way, $B_1$ and $B_2$ can be calibrated in order to normalize the amplitudes.

The offsets $A_1, A_2$ can vary for example by thermal drifts or due to changes in the optical alignment at different measuring distances. The offsets can be removed by high-pass filtering 34a,34b of the signals by temporal variation of the high-frequency phase noise. At short measuring distances, where the influence of the phase noise is small, the optical phase is more or less constant in time. An additional modulation of the phase can be applied for the removal of the offset by the high-pass filtering 34a,34b.

According to the invention, the additional phase modulation can by achieved by at least one of the following methods:

Temporal modulation of the laser wavelength: This will result in a varying phase at the quadrature outputs. A high-pass filtering 34a,34b of the signals allows to remove the offset. Additionally, the average wavelength is stabilized since it is a measure for the distance.

Modulation of the optical path length in one of the interferometer arms (reference or measurement arm): This can be achieved with an opto-electronical or opto-mechanical device, e.g. a piezo-element with a mirror. The high-pass filtering 34a,34b of the temporal varying quadrature signals removes the offset.

For the further processing of the signals in particular the modulation amplitude $B_1,B_2$ is chosen equal in both channels. Thus, a normalization of the signals can be performed.

The high-pass filtering 34a,34b and normalization of the signals can be done with further signal processing means 35a,35b, in particular with analog electronical parts or—as shown for the present embodiment according to FIG. 7—after analog to digital conversion 35a,35b also digitally by a FPGA 36 (field programmable gate array).

Figure 8:
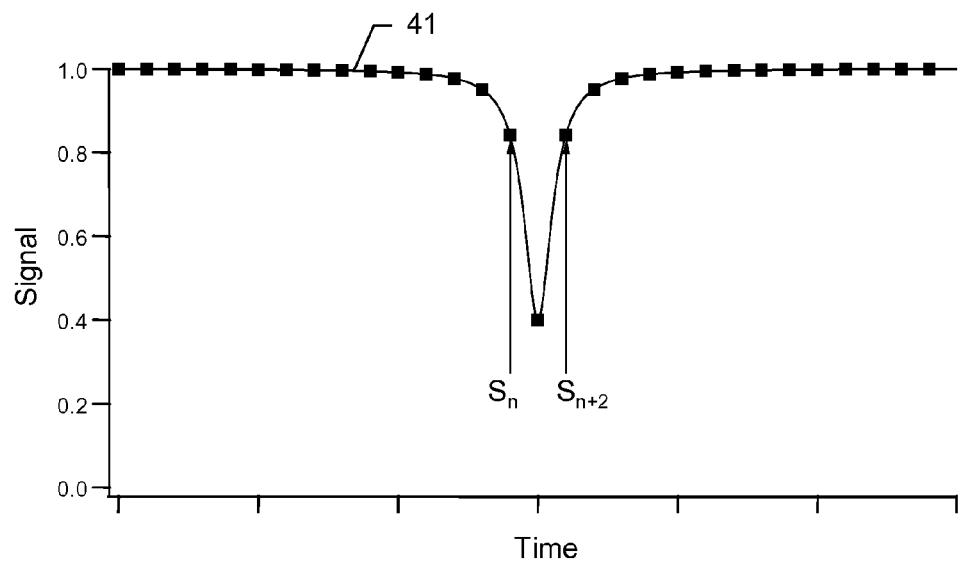
FIG. 8 shows a first embodiment for a concept of wavelength stabilization according to the invention.

FIG. 8 shows a concept of wavelength stabilization according to the invention.

The well-known synchronous detection technique is often used for stabilisation. In such case, the laser is frequency modulated by applying a current modulation and a lock-in (phase-sensitive) detector is used to lock the average laser frequency on the maximum of absorption.

According to the invention, the frequency modulation A causes a modulation of the interference signals. Indeed the interferometer phase is given by $\phi=4\pi(v+\Delta v)d/c$, and in a quadrature detection scheme, the signals are given by $$S_1(t)=A_1+B_1 \sin [\phi+\phi_\tau(t)] \text{ and } S_2(t)=A_2+B_2 \sin [\phi+\phi_\tau(t)+\phi_{det}],$$

wherein $\Delta\phi=4\pi\Delta v d$. Therefore, the interference signal modulation will be especially high at long distances. According to the invention an excursion frequency $\Delta v$ is used so that phase modulation amplitude is greater than $2\pi$. In this way, the offsets $A_1, A_2$ and $B_1, B_2$ can be determined and compensated for. The frequency excursion is thus adapted to the distance d. For instance, at a distance d=1 cm, the frequency excursion must be at least 15 GHz.

Such a frequency excursion requires changing the standard concept of wavelength stabilization technique. A frequency excursion of 15 GHz is higher than the Doppler broadened absorption line of Rubidium or Caesium (typically 600 MHz). Thus, according to the invention, the detected signal at the output of the absorption cell comprises a scan of the full absorption line shape. An appropriate digital processing is used to compute the error signal required by the stabilization loop. The detected signal 41 is shown in present FIG. 8 (after digitisation and sampling). According to the shown embodiment the sampling is started at the beginning of the current modulation and the error signal is computed by the subtraction of specific samples (for instance $S_n-S_{n+2}$). If the line shape is centred within the digitized segment, the difference $S_n-S_{n+2}$ is equal to 0. Otherwise, the difference is positive (line is left-shifted) or negative (line is right-shifted).

FIG. 9 shows an embodiment according to the invention for quadrature detection. Here, a diffractive optical element 45 (DOE) for quadrature detection is used. The DOE 45 acts as a grating which splits a laser beam 46 into several orders. The transmitted zeroth order 47 ($I_0$) builds the measuring beam of the interferometer and is directed to a retro reflector 48. The light of one of the other orders 49 ($I_1$), typically the −1st, or +1st order, is directed to a mirror M1 close to the DOE 45 and acts as the reference beam. After reflection both beams are diffracted by the DOE 45 again. The diffraction orders of both beams superimpose with delays $\tau_0$ and $\tau_1$ in the following way:

D1: −1st order of $I_0$ and 0 order of $I_1$,
D2: 0 order of $I_0$ and +1st order of $I_1$ and
D3: +1st order of $I_0$ and +2nd order of $I_1$.

The interference signals D1 and D3 comprise the interferometric quadrature signals. The grating splits the incoming beams in at least +/−2 orders. The diffraction efficiency of these orders is high enough to obtain a detectable interference signal at D1 and D3. The interference signals comprise a phase shift, in particular of 90°, with respect to each other.

FIGS. 10A and 10B show two embodiments of binary phase gratings 45a,45b for realising quadrature detection according to the invention. A particular grating constraint is fulfilled for example by a binary phase grating 45a with a line-to-space ratio of 0.69:0.31, where the lines introduce a phase delay of $0.3\lambda$ to the passing light (FIG. 10a). According to a further design of a binary phase grating 45b (FIG. 10b), each second line has different width and spacing. Such a grating 45b provides a phase shift of 90°. The lines and spacings have widths of 0.320:0.367:0.055:0.258 with respect to the grating period. The lines introduce a phase delay of $0.3\lambda$ to the passing light.

According to a further embodiment of the invention, a similar quadrature detector concept uses a DOE to realize three outputs with a phase shift of 120° with respect to each other. Such 3-output quadrature detector allows for a more precise determination of the interferometric phase.

Figure 11A:
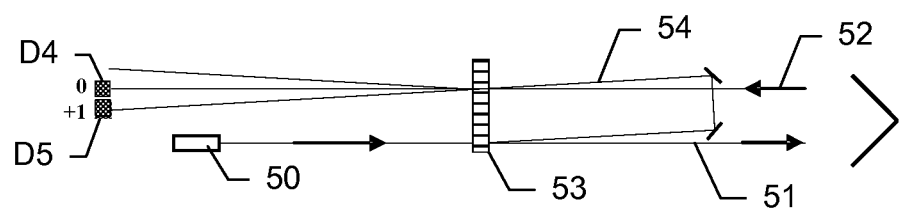
FIG. 11A and FIG. 11B show further embodiments for quadrature detection according to the invention with different optical layout.
Figure 11B:
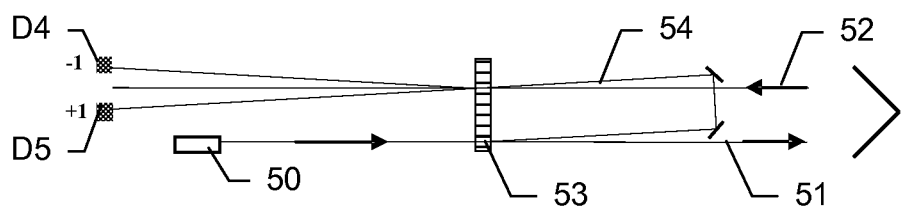

FIGS. 11A and 11B show further embodiments for quadrature detection according to the invention. The optical layout is a variation of the basic concept. Here, the outgoing 51 and the back reflected 52 beam of the measuring beam have different paths and the outgoing and the back reflected beam of the reference beam 54, as well. Therefore, the splitting and the recombination of the beams take place at different locations of the grating 53. One advantage is that no back reflected light is directed towards the laser diode 50 which has otherwise disturbing effects on the laser stability. Second, also the 0-order of diffraction can be used for the generation of an interference signal (FIG. 11a). The 0-order is used together with the +1st order to obtain quadrature signals which are balanced regarding the amplitude and modulation strength. The signals are detected with particular detectors D4,D5. With an adequate line-to-space ratio of the grating a phase shift of 90° can be achieved. FIG. 11b shows an alternative configuration regarding the position of the detectors D4,D5 for detecting light of +1st and −1st order.

What is claimed is:

1. A method for determining a change of distance to an object by interferometry with emitting measurement laser light from a laser diode,
    receiving at least a part of the measurement laser light reflected from the object,
    superimposing the reflected measurement laser light with a reference laser light and thereby providing an interferometric phase and
    determining the change of distance to the object depending on the superimposition, wherein
    the measurement laser light being emitted with low coherence and broad spectral bandwidth, wherein an emitting wavelength of the measurement laser light is fluctuating hop-freely within the spectral bandwidth causing interferometric phase fluctuations, wherein the measurement laser light is emitted with a coherence length between one and three meters,
    continuously detecting the interferometric phase with a first detection rate, the detection rate and a rate for processing of the detected interferometric phase being high enough that the interferometric phase fluctuations are continuously incrementally tracked so that successive interferometric phase states provided by successive detections of the interferometric phase differ by a phase shift of less than $\pi$,
    averaging the detected phase fluctuations for a defined averaging time period and deriving an averaged phase, and
    determining the change of distance to the object with a second detection rate in dependency on the averaged phase, the second detection rate being correlated with the averaging time period.

2. The method according to claim 1, wherein a first, a second or more interferometric signals are provided by continuously detecting the superimposition of the measurement laser light with the reference laser light with the first detection rate.

3. The method according to claim 2, wherein
    the interferometric phase and the interferometric phase fluctuations are derived from at least the first and the second interferometric signals and/or
    the change of distance to the object is determined on basis of at least the first and the second interferometric signals, wherein a direction of the change of distance is derived depending on a change of at least the first and/or the second interferometric signal.

4. The method according to claim 2, wherein the first and/or second or more interferometric signals are modulated in a defined manner, wherein
    the modulated first and/or second or more interferometric signals are detected in order to calculate an offset and/or a normalization for monitoring of the interferometric signals, to calculate the offset and/or the normalization from at least the first and the second interferometric signals while modulating, and/or
    an absolute distance to the object is derived on basis of the modulated first and/or second or more interferometric signals.

5. The method according to claim 4, wherein modulating the first, second or more interferometric signals is realized by
    periodically alternately varying the emitting wavelength of the measurement laser light by varying the current and/or the temperature of the laser diode and/or by varying the cavity length, and/or
    periodically alternately varying an optical path length for the measurement laser light or for the reference laser light.

6. The method according to claim 1, wherein an actual absorbing level of the measurement laser light is measured in dependency on the emitting wavelength and the emitting wavelength of the measurement laser light is adjusted in dependency on the actual absorbing level in an automated and continuous manner, wherein the emitting wavelength is adjusted by variation of current and/or temperature and/or cavity length of the laser diode.

7. The method according to claim 6, wherein an error value is calculated depending on an absorbing level measured while modulating the first and/or second or more interferometric signals in the defined manner, wherein the adjusting of the emitting wavelength is performed in dependency on the calculated error value, wherein the error value is calculated by digital processing.

8. The method according to claim 7, wherein the error value is used for fine adjusting a conversion factor, the conversion factor defining a conversion from continuously determined phase values to distance change values, in order to increase accuracy for the determined change of distance.

9. The method according to claim 1, wherein the interferometric phase fluctuations are continuously incrementally tracked so that successive interferometric phase states provided by successive detections of the interferometric phase differ a fraction of H.

10. An interferometer for determining a change of distance to an object, the interferometer comprising:
    a laser diode for emission of measurement laser light,
    a reference arm defining a reference optical path length for a reference laser light, wherein the reference laser light is derived from the measurement laser light by use of a beam splitter,
    a measurement arm defining a measurement optical path length for the measurement laser light,
    receiving means for receiving at least a part of the measurement laser light reflected from the object,
    superimposition means for superimposing of the measurement laser light with the reference laser light and thereby providing an interferometric phase,
    a detection unit for continuously detecting the superimposition of the measurement laser light with the reference laser light and providing the interferometric phase and
    a controlling and processing unit at least for determining the change of distance to the object depending on the superimposition,
    wherein the laser diode is configured so that the measurement laser light is emitted with low coherence and broad spectral bandwidth,
    wherein an emitting wavelength of the measurement laser light is fluctuating hop-freely within the spectral bandwidth causing interferometric phase fluctuations,
    wherein the measurement laser light is emitted with a coherence length between one and three meters, wherein the controlling and processing unit is adapted for execution of a distance measurement functionality on execution of which the determination of the change of distance to the object is performed by continuously detecting the interferometric phase with the detection unit with a first detection rate, the detection rate and a rate for processing of the detected interferometric phase being high enough that the interferometric phase fluctuations are continuously incrementally tracked so that successive interferometric phase states provided by successive detections of the interferometric phase differ by a phase shift of a fraction of $\pi$, averaging the detected phase fluctuations for a defined averaging time period and deriving an averaged phase, and determining the change of distance to the object with a second detection rate in dependency on the averaged phase, the second detection rate being correlated with the averaging time period.

11. The interferometer according to claim 10, wherein the superimposition means being built so that the measurement laser light is superimposed with the reference laser light so that a first, a second or more superimposed light signals are provided, wherein the superimposition means comprise a binary phase grating.

12. The interferometer according to claim 11, wherein the detection unit comprises a first, a second or more detection components, wherein each of the detection components is arranged for detection of one of the first, second or more superimposed light signals and a first, second or more interferometric signals are providable by the detection components, wherein the detection unit comprises:
an analog-digital converter and a programmable logistic device, or
limiting amplifiers and zero-crossing quadrature detection for processing the interferometric signals.

13. The interferometer according to claim 12, wherein the interferometer comprises a modulation unit for modulation of the first and/or the second or more interferometric signals in a defined manner and detecting the modulated first and/or second or more interferometric signals for continuously incrementally tracking phase fluctuations,
wherein the modulation unit comprises an acousto-optical modulator and/or an opto-mechnical or opto-electroical device for providing the modulation of the first and/or the second or more interferometric signals by
periodically alternately varying the emitting wavelength of the measurement laser light and/or
periodically alternately varying the optical path length of the measurement arm or of the reference arm.

14. The interferometer according to claim 10, wherein
the laser diode is built as a Vertical Cavity Surface Emitting Laser Diode comprising a Bragg grating,
wherein the laser diode is designed such that the emitting wavelength of the measurement laser light is adjustable within a wavelength region, wherein the wavelength is adjustable by variation of temperature and/or current of the laser diode,
wherein the interferometer comprises an absorbing medium defining absorbing levels within the wavelength region and an absorption detector for measuring an actual absorbing level of the measurement laser light in dependency on the emitting wavelength, wherein the absorbing medium is provided by an atomic or molecular absorption cell,
wherein the absorption cell comprises rubidium vapor or cesium vapor, and/or wherein the interferometer comprises an adjusting unit being built for controlling temperature and/or current for the laser diode, wherein the adjusting unit comprises a temperature sensor, a proportional-integrator regulator and a Peltier element for adjusting the temperature.

15. A measurement device for determination of a position of an object or of a position of a measuring point, comprising an interferometer according to claim 10, wherein the measurement device is built as geodetic measurement device, comprising a base defining a vertical axis, a support member rotatable around the vertical axis relative to the base and defining a horizontal axis, an aiming unit rotatable around the vertical and the horizontal axis relative to the base for directing the measurement laser light towards the object and angle measurement means for determination of an orientation of the aiming unit relative to the base and the support member.

16. The measurement device according to claim 15 wherein the geodetic measurement device comprises a total station or a laser tracker.

17. A measurement device for determination of a position of an object or of a position of a measuring point, comprising an interferometer according to claim 10, wherein the measurement device is built as coordinate measuring machine, comprising
a base,
a drive mechanism, adapted to drive a probe head in a manner such that the probe head is capable to move relative to the base for approaching a measurement point and
a frame structure, to which the probe head is attached, the frame structure being movable in a horizontal and a vertical direction.

18. A computer program product with program code being stored on a machine readable, non-transitory medium, the program code being configured to automatically execute and operate the method comprising:
receiving at least a part of a measurement laser light reflected from an object,
superimposing the reflected measurement laser light with a reference laser light and thereby providing an interferometric phase and
determining the change of distance to the object depending on the superimposition, wherein
the measurement laser light being emitted with low coherence and broad spectral bandwidth, wherein an emitting wavelength of the measurement laser light is fluctuating hop-freely within the spectral bandwidth causing interferometric phase fluctuations, wherein the measurement laser light is emitted with a coherence length between one and three meters,
continuously detecting the interferometric phase with a first detection rate, the detection rate and a rate for processing of the detected interferometric phase being high enough that the interferometric phase fluctuations are continuously incrementally tracked so that successive interferometric phase states provided by successive detections of the interferometric phase differ by a phase shift of a fraction than $\pi$,
averaging the detected phase fluctuations for a defined averaging time period and deriving an averaged phase, and
determining the change of distance to the object with a second detection rate in dependency on the averaged phase, the second detection rate being correlated with the averaging time period.

19. The computer program product according to claim 18, wherein a first, a second or more interferometric signals are provided by continuously detecting the superimposition of the measurement laser light with the reference laser light with the first detection rate.

20. The computer program product according to claim 18, wherein the interferometric phase and the interferometric phase fluctuations are derived from at least the first and the second interferometric signals and/or the change of distance to the object is determined on basis of at least the first and the second interferometric signals, wherein a direction of the change of distance is derived depending on a change of at least the first and/or the second interferometric signal.

* * * * *